Figure 4:
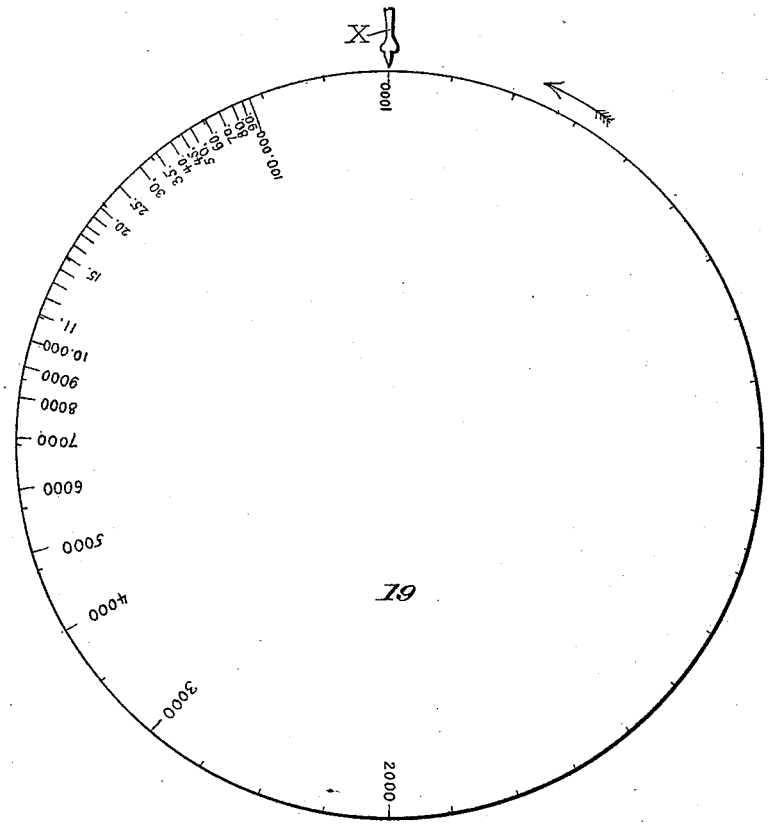

(No Model.) 2 Sheets—Sheet 1.
A. A. MICHELSON.
OPTICAL TELEMETER.
No. 452,060. Patented May 12, 1891.
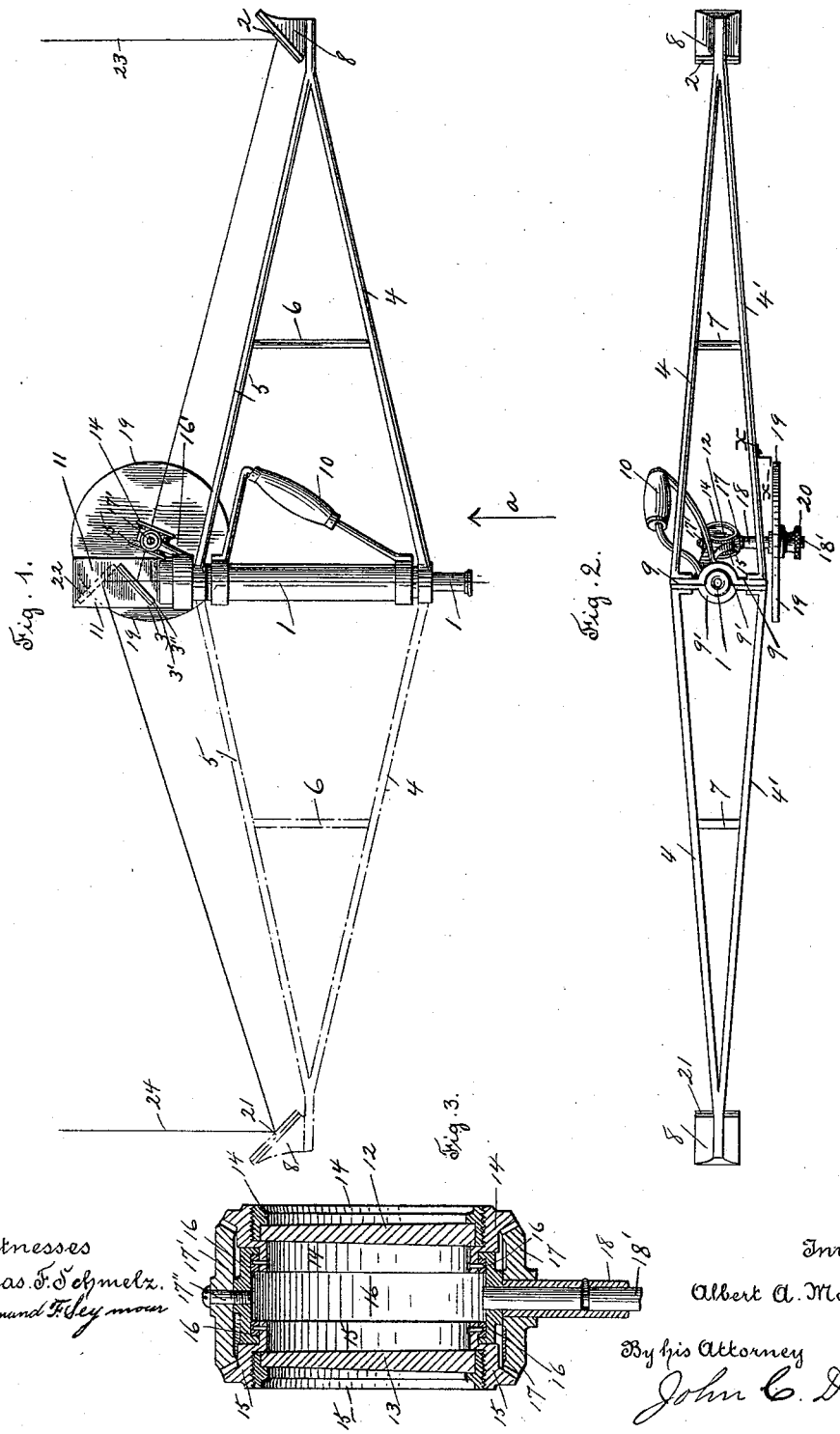
Witnesses
Chas. F. Schmelz.
Edmund F. Seymour
Inventor
Albert A. Michelson,
By his Attorney
John C. Dewey (No Model.) 2 Sheets—Sheet 2.

A. A. MICHELSON.
OPTICAL TELEMETER.

No. 452,060. Patented May 12, 1891.

Witnesses
Chas. F. Schmelz.
Chas. S. Short, Jr.

Inventor
Albert A. Michelson,
By his Attorney
John C. Dewey

UNITED STATES PATENT OFFICE.

ALBERT A. MICHELSON, OF WORCESTER, MASSACHUSETTS.

OPTICAL TELEMETER.

SPECIFICATION forming part of Letters Patent No. 452,060, dated May 12, 1891.

Application filed November 7, 1890. Serial No. 370,646. (No model.)

*To all whom it may concern:*

Be it known that I, ALBERT A. MICHELSON, a citizen of the United States, residing at Worcester, in the county of Worcester and State of Massachusetts, have invented certain new and useful Improvements in Telemeters; and I do hereby declare that the following is a full, clear, and exact description thereof, which, in connection with the drawings making a part of this specification, will enable others skilled in the art to which my invention belongs to make and use the same.

My invention relates to telemeters; and the object of my invention is to produce a telemeter of simple construction and effective operation.

My invention consists in certain novel features of construction and operation of a telemeter, as will be hereinafter fully described.

My telemeter consists of a telescope and two or four plane mirrors, and a prism or prisms or other means for effecting the coincidence of the rays of light, and means for supporting the same.

Referring to the drawings, Figure 1 is a plan view of my telemeter, the broken lines representing a duplication of the frame and the employment of two additional mirrors. Fig. 2 is a rear side view looking in the direction of arrow *a*, Fig. 1. Fig. 3 is a sectional detail, on an enlarged scale, illustrating one way of supporting and adjusting the prisms; and Fig. 4 is a detail showing on an enlarged scale the graduated disk and the scale thereon.

In the accompanying drawings the frame of the telemeter for supporting the telescope 1 and the plane mirrors 2 and 3 consists, preferably, of a frame-work composed of two pairs of rods 4 and 4' and 5 and 5'. Said rods 4 and 4' and 5 and 5' are united at their outer ends and have a stand 8 secured thereto, on which is supported and secured the plane mirror 2, making an angle of about fifty-two degrees with the axis of the telescope. The inner ends of the rods 4 and 4' and 5 and 5' are tied together by the bar 9, having the circular portion 9', in which is supported and secured the telescope 1.

Secured to the telescope 1 or to the frame-work supporting the telescope is a handle 10, by means of which the telemeter may be held by the operator.

Supported in front of the object end of the telescope 1, preferably on an arm 11, extending out from the frame of the telemeter, is a stationary mirror 3, arranged parallel to the mirror 2. The mirror 3 is preferably a plane glass carrying a semi-transparent coat of silver or platinum 3', the rear face of which is protected by a second similar plate of glass 3''.

The adjustment for the coincidence of the rays of light is effected in this instance by means of a pair of prisms 12 and 13, supported in beveled gear-rims 14 and 15, which in turn are supported and revolved on the ends of a stationary cylinder 16, held in the outer end of the arm 16', secured at its inner end on the telescope or on the frame of the telemeter.

The beveled gear-rims 14 and 15, carrying the prisms 12 and 13, are revolved to cause said prisms to rotate in opposite directions by means of a pinion 17 on the end of the sleeve 18, which is journaled on a rod 18', firmly held at its inner end in the stationary cylinder 16, (see Fig. 3,) said pinion meshing with said beveled gear-rims. A second pinion 17', supported on a stud 17'', secured on the cylinder 16, may also be used. A graduated disk 19 and thumb-screw 20 are secured on the sleeve 18, so that any rotation on the part of the disk 19 by means of the thumb-screw 20 or otherwise will result in a rotation of both prisms 12 and 13, but in an opposite direction, as above stated.

I have described my telemeter constructed with two mirrors 2 and 3. It may be desirable to use a second pair of mirrors, in which case the frame of the telemeter is extended beyond the telescope, as shown by broken lines, Fig. 1, and full lines, Fig. 2. The supplemental frame is constructed in the same manner as the frame shown by full lines, Fig. 1, and above described, and upon the outer end thereof is secured a third mirror 21, making an angle with the axis of the telescope of about fifty-four degrees. A fourth stationary mirror 22, parallel to mirror 21, extends in front of the object-glass of the telescope, and in this instance in front of the mirror 3, supported on the arm 11.

From the above description, in connection with the drawings, the operation of my telemeter will be readily understood by those skilled in the art, and is as follows: The telemeter, by means of the handle 10, may be held in a horizontal or vertical position by one hand of the operator. The other hand is free to turn the thumb-screw 20, and through pinion 17, fast on rod 18, revolve the beveled gear-rims 14 and 15, carrying the prisms 12 and 13, thus rotating said prisms in opposite directions, which will alter the effective angle of the prisms, and hence the direction of the ray 23, reflected from the mirror 2 onto the mirror 3, and thence to the eye of the observer through the telescope. In case four mirrors are used the ray of light 24 will be reflected from the mirror 21 onto the mirror 22 and from mirror 22 through the mirror 3. By means of the adjustment of the prisms 12 and 13 the ray 24 is made to coincide with the ray 23 until the two rays of light from the object coincide to form one image. The true angle at which the rays of light strike the mirrors may be ascertained by means of the graduated disk 19, and the distance of the object may be readily calculated, as follows: In the first place the two pairs of mirrors 2 and 3 and 21 and 22 are properly adjusted and secured in place so that two rays of light, as 23 and 24, from a very distant source (the sun or the horizon) are rendered parallel before entering the telescope. One of said rays of light impinges on the mirrors 2 and 3 and the other on the mirrors 21 and 22. The two rays of light being parallel, the two images of the object will coincide, and this coincidence is in fact the best method of insuring said adjustment.

The telemeter having been properly adjusted, as above described, is now ready for use.

If the telemeter is directed toward an object whose distance it is desired to ascertain, the images of said object do not coincide, owing to the fact that the rays of light, as 23 and 24, to the mirrors 2 and 21, respectively, are no longer parallel, but make an angle with each other, which is smaller the farther the object is away. Thus, if D is the distance required, and B the distance between the mirrors 2 and 21, and $e$ the angle which B subtends at the distance D, then $D = \frac{B}{E}$.

B—that is, the distance between the mirrors 2 and 21—may be measured and $e$ may be found by turning the prisms 12 and 13 until the two images coincide. When said images coincide, the two rays which enter the telescope will be parallel, as before, and hence the angle through which the ray was bent by the prisms must be equal to the angle $e$. This angle can be found from the known relation between the rotation of the prisms and the bending of the ray. If M is the maximum displacement which the prisms can produce, and $w$ is the relative rotation of the prisms, this relation is, (1) $E = M, \text{cosine}^2 \tfrac{1}{2} w$, so that (2) $D = \frac{B}{M, \text{cosine}^2 \tfrac{1}{2} w}.$ Suppose now that $D_1$ is the shortest distance it may be required to measure, and therefore that distance corresponding to one complete rotation of the prisms, (half a turn for each.) Then the displacement is greatest, or M; and therefore (3) $D_1 = \frac{B}{M}$, whence $M = \frac{B}{D_1}$. With this value of M in (2) we have, finally, $D = \frac{D_1}{\text{cosine}^2 \tfrac{1}{2} w}.$ $D_1$ can easily be determined once for all for any particular instrument in one way, as follows: The telemeter is held by the operator, and an attendant stations himself at a distance from the instrument—say about one thousand feet—with a signal. The telescope is pointed at the signal and the signal is moved toward or away from the telemeter until by revolving the prisms the two images coincide. Then the distance from the telemeter to the signal may be accurately measured, and this will be $D_1$ for that instrument. After determining $D_1$ a table may be constructed, as follows:

| Feet. | Inches from zero. |
|---|---|
| 1,000 at | 00.00 |
| 2,000 at | 18.00 |
| 3,000 at | 21.96 |
| 4,000 at | 24.00 |
| 5,000 at | 25.36 |
| 6,000 at | 26.36 |
| 7,000 at | 27.12 |
| 8,000 at | 27.72 |
| 9,000 at | 28.20 |
| 10,000 at | 28.63 |
| 11,000 at | 28.98 |
| 12,000 at | 29.30 |
| 13,000 at | 29.56 |
| 14,000 at | 29.80 |
| 15,000 at | 30.02 |
| 16,000 at | 30.22 |
| 17,000 at | 30.38 |
| 18,000 at | 30.54 |
| 19,000 at | 30.70 |
| 20,000 at | 30.84 |
| 25,000 at | 31.38 |
| 30,000 at | 31.80 |
| 35,000 at | 32.10 |
| 40,000 at | 32.36 |
| 45,000 at | 32.58 |
| 50,000 at | 32.74 |
| 60,000 at | 33.04 |
| 70,000 at | 33.26 |
| 80,000 at | 33.44 |
| 90,000 at | 33.58 |
| 100,000 at | 33.70 |

Said table gives for every value of $w$ (measured in degrees at the circumference of the rings holding the prisms) the corresponding distance D; but it is much more convenient to be able to read distances at once, and for this purpose the disk 19 (which moves half as fast as the prisms, the ratio of the gearing being one to two) may be graduated into parts, reading thousands of feet directly. Thus, if the disk measures thirty-six inches in circumference and the distance D be one thousand feet, the divisions on the disk should read as shown in Fig. 4. As above stated, the disk 19 and thumb-screw 20 are fast on the sleeve 18, on the inner end of which is fast the pinion 17. Therefore at any revolution of said pinion to cause the prisms to revolve the disk 19 and thumb-screw 20 will also revolve, causing the scale thereon to pass by the end of the pointer X, secured in this instance on the frame of the telemeter, as shown in Fig. 2. The pointer X may be secured on the telescope itself, or on any other part of the telemeter-frame, if preferred, and the pointer should correspond with the scale on the disk, so as to indicate the zero-point when the mirrors are properly adjusted, as above stated.

To ascertain the distance of an object by means of the disk 19, it is only necessary to revolve the prisms and with them the disk 19 until the images coincide and form one image, and then read off the disk 19 the distance to which pointer X points on said disk, as four thousand feet, or forty thousand, &c.

The subdivisions of the scale of the disk 19 are made up accurately from the table given above.

It will be understood that the object is not viewed directly through the telescope, as in the case of the sextant, but only by reflection from the mirrors 2 and 3. It will also be understood that there is no movable mirror in my telemeter, as in sextants, quadrants, reflecting-circles, &c.

The details of construction of my telemeter may be varied some from what is shown and described, and it may be adapted to be combined and used with a surveyor's instrument or theodolite for ascertaining the distance of objects.

I prefer to use a pair of prisms for securing the coincidence of the two images, as above described; but, if preferred, a single prism may be used instead of a pair, which could be rotated in its own plane or at right angles. The prism may be placed within the telescope, covering half the field, and may be rotated or moved parallel to itself along the telescope, the other half of the field being covered by a similar but stationary prism. The pair of prisms may be replaced by two plane glasses, the rotation of one of them producing the displacement.

The mirrors 3 and 22, placed in front of the object end of the telescope, instead of being arranged one in front of the other, as shown, may be arranged one over the other, each covering half of the field of the object-glass of the telescope.

Having thus described my invention, what I claim as new, and desire to secure by Letters Patent, is—

1. In a telemeter, the combination, with a telescope, of a stationary mirror in front of the telescope, and a stationary mirror on the end of the frame opposite from the telescope, and a prism or prisms for effecting the coincidence of the rays of light, substantially as set forth.

2. In a telemeter, the combination, with the telescope and two pairs of stationary mirrors, two of said mirrors being placed at a fixed distance apart, of a prism or prisms for effecting the coincidence of the images, means for operating said prisms, and a disk or scale moving relatively with said prisms past a pointer, and said pointer, for the purpose stated, substantially as set forth.

ALBERT A. MICHELSON.

Witnesses:
 JOHN C. DEWEY,
 EDMUND F. SEYMOUR.